United States Patent
Wang et al.

(10) Patent No.: US 10,382,943 B2
(45) Date of Patent: Aug. 13, 2019

(54) DATA SERVICE PROCESSING METHOD, APPARATUS, AND SYSTEM IN ROAMING SCENARIO

(71) Applicant: Huawei Technologies Co., Ltd., Shenzhen, Guangdong (CN)

(72) Inventors: Chunguang Wang, Shanghai (CN); Yijun Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 233 days.

(21) Appl. No.: 14/936,383

(22) Filed: Nov. 9, 2015

(65) Prior Publication Data

US 2016/0066175 A1  Mar. 3, 2016

Related U.S. Application Data

(63) Continuation of application No. PCT/CN2013/075589, filed on May 14, 2013.

(51) Int. Cl.
*H04W 8/12* (2009.01)
*H04W 48/00* (2009.01)
(Continued)

(52) U.S. Cl.
CPC .......... *H04W 8/02* (2013.01); *H04W 48/17* (2013.01); *H04W 8/082* (2013.01); *H04W 8/12* (2013.01)

(58) Field of Classification Search
CPC ....... H04W 48/17; H04W 8/02; H04W 8/082; H04W 8/12; H04W 80/04; H04W 84/045; H04W 88/16; H04W 12/06; H04W 36/0033; H04W 36/08; H04W 48/02; H04W 48/08; H04W 48/16; H04W 48/18; H04W 48/20; H04W 4/02; H04W 4/24; H04W 74/00; H04W 76/02; H04W 76/021; H04W 76/026; H04W 8/26;
(Continued)

(56) References Cited

U.S. PATENT DOCUMENTS

2008/0070570 A1  3/2008  Jiang
2010/0054222 A1  3/2010  Rune
(Continued)

FOREIGN PATENT DOCUMENTS

| CN | 101483585 A | 7/2009 |
|---|---|---|
| CN | 101554070 A | 10/2009 |
| CN | 101635915 A | 1/2010 |

OTHER PUBLICATIONS

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.0.0, Mar. 2013, 290 pages.

*Primary Examiner* — Erica Navar (57) ABSTRACT

A data service processing method in a roaming scenario includes: acquiring information about a roaming service provider selected by a subscriber, where the acquired information includes an identifier of the roaming service provider; selecting a gateway according to the acquired information about the roaming service provider; and performing data service processing by using the gateway. In addition, a corresponding network side device and a corresponding communications system are further provided.

6 Claims, 6 Drawing Sheets

(51) Int. Cl.
*H04W 8/02* (2009.01)
*H04W 8/08* (2009.01)

(58) Field of Classification Search
CPC ........... H04L 29/12132; H04L 61/1552; H04L 61/3075; H04L 63/162
See application file for complete search history.

(56) References Cited

U.S. PATENT DOCUMENTS

| | | |
|---|---|---|
| 2011/0130140 A1 | 6/2011 | Fadell |
| 2012/0063437 A1 | 3/2012 | Liang et al. |
| 2012/0147824 A1* | 6/2012 | Van der Merwe .... H04W 84/02 370/329 |
| 2012/0184294 A1 | 7/2012 | Stojanovski et al. |
| 2012/0252445 A1* | 10/2012 | Lindholm ............... H04W 8/26 455/433 |
| 2013/0044709 A1* | 2/2013 | Adjakple ............ H04W 76/025 370/329 |

* cited by examiner

DATA SERVICE PROCESSING METHOD, APPARATUS, AND SYSTEM IN ROAMING SCENARIO

CROSS-REFERENCE TO RELATED APPLICATIONS

This application is a continuation of International Application No. PCT/CN2013/075589, filed on May 14, 2013, which is hereby incorporated by reference its entirety.

TECHNICAL FIELD

The present invention relates to the field of communications technologies, and specifically, to a data service processing method, apparatus, and system in a roaming scenario.

BACKGROUND

At present, international roaming charges relatively high, and a subscriber usually needs to pay high roaming charges for a data service used during roaming. Currently, the Body of European Regulators for Electronic Communications (BEREC) promotes "decoupling" between a roaming service and a local service, so as to implement that a subscriber can select a roaming service provider (ARP, Alternative Roaming Provider) in a roaming area, so that roaming charges are reduced, and a subscriber benefits from an increasingly attractive roaming price. Local breakout (LBO) is one of implementation technical solutions recommended by the BEREC.

As one of solutions for implementing "decoupling" between a roaming service and a local service, LBO is a solution in which a visited network operator provides a data service for a subscriber, a home operator does not need to participate in the providing of the data service except for performing authorization and authentication on a subscriber identity module (SIM) card, and the visited operator serves as an alternative roaming service provider. For convenience of a subscriber, the BEREC specifies a uniform access point name (APN), and different roaming service providers may provide a roaming service for the subscriber by using the APN. In an LBO scenario, a roaming service provider may be a visited network operator (MNO, Mobile Network Operator), or may be a mobile virtual network operator (MVNO, Mobile Virtual Network Operator). The MVNO generally refers to an operator that does not have a business license or whose development scale is limited, and that develops its own subscriber by using an existing network of a basic mobile operator and provides a service for the subscriber. Because in an LBO scenario, a roaming service provider may be a visited network operator, or may be an MVNO that leases a resource of the visited network operator, it is of significant importance to differentiate who should provide a roaming service, which relates to gateway selection and charging settlement.

In a process of studying and practicing the prior art, the inventor of the present invention finds that, in an LBO scenario, if an MVNO serves as a roaming service provider to provide a roaming service, because an international mobile subscriber identity (IMSI) of a subscriber is a home IMSI, a visited network cannot differentiate the roaming service provider by using the IMSI; moreover, because APNs of multiple roaming service providers are defined in a uniform manner, which roaming service provider provides a service cannot be learned by using the APNs, either. That is, in a case in which the MVNO serves as a roaming service provider, the roaming service provider cannot be identified and differentiated in the prior art, which causes a problem that, for example, a gateway cannot be subsequently selected.

SUMMARY

Embodiments of the present invention provide a data service processing method, apparatus, and system in a roaming scenario, which can identify and differentiate a roaming service provider in a case in which an MVNO serves as the roaming service provider, so as to facilitate subsequent selection of a gateway, and the like.

According to a first aspect, an embodiment of the present invention provides a data service processing method in a roaming scenario, including:

acquiring information about a roaming service provider selected by a subscriber, where the information about the roaming service provider includes an identifier of the roaming service provider;

selecting a gateway according to the acquired information about the roaming service provider; and performing data service processing by using the gateway.

According to a second aspect, an embodiment of the present invention further provides a network side device, including an acquiring unit, a selecting unit, and a processing unit, where:

the acquiring unit is configured to acquire information about a roaming service provider selected by a subscriber, where the information about the roaming service provider includes an identifier of the roaming service provider;

the selecting unit is configured to select a gateway according to the acquired information about the roaming service provider; and the processing unit is configured to perform data service processing by using the gateway.

According to a third aspect, an embodiment of the present invention further provides a communications system, including any network side device provided in embodiments of the present invention.

According to a fourth aspect, an embodiment of the present invention further provides a network side device, including a processor, a memory configured to store data, and a transceiver unit configured to send and receive data, where:

the processor is configured to acquire information about a roaming service provider selected by a subscriber, where the information about the roaming service provider includes an identifier of the roaming service provider; select a gateway according to the acquired information about the roaming service provider; and perform data service processing by using the gateway.

According to the embodiments of the present invention, information about a roaming service provider selected by a subscriber is acquired, where the information about the roaming service provider includes an identifier of the roaming service provider; then a gateway is selected according to the acquired information about the roaming service provider; and data service processing is performed by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person skilled in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Embodiments of the present invention provide a data service processing method, apparatus, and system in a roaming scenario, which are separately described in detail in the following.

Embodiment 1

This embodiment is described from a perspective of a visited network element, that is, a network side device of a visited network, where the visited network element may be specifically a serving general packet radio service (GPRS, General Packet Radio Service) support node (SGSN), a mobility management entity (MME), or the like.

A data service processing method in a roaming scenario includes: acquiring information about a roaming service provider selected by a subscriber, where the information about the roaming service provider includes an identifier of the roaming service provider; selecting a gateway according to the acquired information about the roaming service provider; and performing data service processing by using the gateway.

Figure 1:
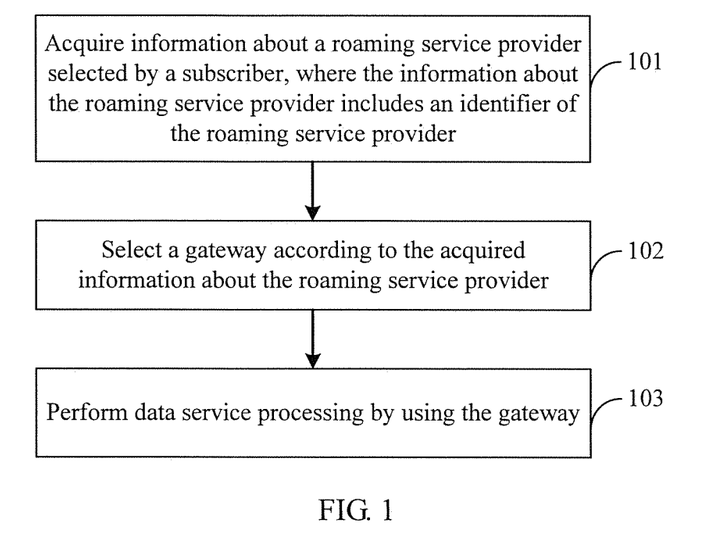
FIG. 1 is a flowchart of a data service processing method in a roaming scenario according to Embodiment 1 of the present invention.

As shown in FIG. 1, a specific process may be as follows:

101. Acquire the information about the roaming service provider selected by the subscriber, where the information about the roaming service provider includes at least information that can be used to identify the roaming service provider, that is, the identifier of the roaming service provider, which, for example, may be specifically information such as an MVNO identifier or a virtual APN, where the virtual APN is different from an actually used APN, and the virtual APN is mainly used to identify an MVNO.

For example, specifically, any one of the following methods may be used to acquire the information about the roaming service provider selected by the subscriber:

(1) Acquire, from a home subscriber server (HSS) of a home network, the information about the roaming service provider selected by the subscriber, which, for example, may be specifically as follows:

after the home subscriber server of the home network initiates a detach procedure to a user terminal, receiving an attach request reinitiated by the user terminal; and requesting authentication and location update from the home subscriber server of the home network according to the reinitiated attach request, and returning, by the home subscriber server of the home network, an authentication success response and a location update acknowledgment message, where the authentication success response carries the information about the roaming service provider selected by the subscriber, or the location update acknowledgment message carries the information about the roaming service provider selected by the subscriber.

The information about the roaming service provider selected by the subscriber is generated by the home subscriber server of the home network according to "a mapping relationship between a subscriber identifier and the identifier of the roaming service provider selected by the subscriber", where the mapping relationship is provided by a roaming service support system. For ease of description, in this embodiment of the present invention, the mapping relationship between the subscriber identifier and the identifier of the roaming service provider selected by the subscriber is referred to as a first mapping relationship.

For example, specifically, after the subscriber selects an MVNO as the roaming service provider and performs subscription online, the roaming service support system sends the first mapping relationship to the home subscriber server of the home network, and after receiving the first mapping relationship, the home subscriber server of the home network generates the information about the roaming service provider according to the first mapping relationship, and may initiate a detach procedure for the user equipment.

(2) Acquire, from a roaming agent device, the information about the roaming service provider selected by the subscriber, which, for example, may be specifically as follows:

receiving indication information that is sent by a roaming agent and indicates that the subscriber selects a new roaming service provider, where the indication information carries the information about the roaming service provider selected by the subscriber.

The information about the roaming service provider selected by the subscriber is generated by the roaming agent according to a first mapping relationship provided by a roaming service support system.

For example, specifically, after the subscriber selects an MVNO as the roaming service provider and performs subscription online, the roaming service support system sends the first mapping relationship to the roaming agent, and after receiving the first mapping relationship, the roaming agent generates the information about the roaming service provider according to the first mapping relationship and sends, to the visited network element, the indication information indicating that the subscriber selects a new roaming service provider, so as to trigger the visited network to initiate a detach procedure for a user terminal, that is:

after the step of "receiving indication information that is sent by a roaming agent and indicates that the subscriber selects a new roaming service provider", the method may further include:

initiating the detach procedure to the user terminal according to the indication information (that is, the indication information indicating that the subscriber selects a new roaming service provider); receiving an attach request reinitiated by the user terminal; requesting authentication from a home subscriber server of a home network according to the attach request; and receiving an authentication success response returned by the home subscriber server of the home network.

(3) Acquire, from a home subscriber server of a visited network, the information about the roaming service provider selected by the subscriber, which, for example, may be specifically as follows:

receiving a subscription data insertion message sent by the home subscriber server of the visited network, where the subscription data insertion message carries the information about the roaming service provider selected by the subscriber.

The information about the roaming service provider selected by the subscriber is generated by the home subscriber server of the visited network according to a first mapping relationship provided by a roaming service support system.

For example, specifically, after the subscriber selects an MVNO as the roaming service provider and performs subscription online, the roaming service support system sends the first mapping relationship to the home subscriber server of the visited network, and after receiving the first mapping relationship, the home subscriber server of the visited network generates subscription data of the subscriber, where the subscription data includes the information about the roaming service provider (for example, the identifier of the roaming service provider or a virtual access point name), and then sends the subscription data insertion message to an SGSN or MME of the visited network, so that after receiving the subscription data insertion message, the SGSN or MME of the visited network initiates a detach procedure for a user terminal, that is:

after the step of "receiving a subscription data insertion message sent by the home subscriber server of the visited network", the method may further include:

initiating the detach procedure to the user terminal according to the subscription data insertion message;

receiving an attach request reinitiated by the user terminal;

requesting authentication from a home subscriber server of a home network according to the attach request; and receiving an authentication success response returned by the home subscriber server of the home network.

(4) Acquire, from a user terminal, the information about the roaming service provider selected by the subscriber, which, for example, may be specifically as follows:

receiving an attach request reinitiated by the user terminal, where the attach request carries the information about the roaming service provider selected by the subscriber.

The information about the roaming service provider selected by the subscriber is provided by a roaming service support system for the user terminal.

For example, specifically, after the subscriber selects an MVNO as the roaming service provider and performs subscription online, the roaming service support system generates the information about the roaming service provider according to a first mapping relationship, and sends the information about the roaming service provider to the user terminal, for example, specifically, the information about the roaming service provider may be sent to the user terminal in a manner such as device management (OMA DM, Open Mobile Alliance Device Management) or over the air (OTA).

102. Select the gateway according to the information about the roaming service provider that is acquired in step 101.

The gateway may be specifically a packet data gateway (P-GW, Packet Data Network Gateway) or a serving gateway (S-GW).

103. Perform data service processing by using the gateway selected in step 102, for example, perform subsequent data service access or charging settlement.

In addition, optionally, before the information about the roaming service provider selected by the subscriber is acquired (that is, step 101), the method may further include:

receiving a data service request initiated by a user terminal, and redirecting the data service request to a roaming service support system, so that the roaming service support system sends information about multiple roaming service providers to the user terminal for selection by the subscriber.

After selecting the roaming service provider, for example, after selecting an MVNO, the user terminal can perform online subscription with the roaming service provider, so as to create account information of the user terminal. The account information may include a user terminal identifier, for example, an IMSI, or may include information such as a charging policy and/or a quality of service (QoS) parameter of a service bearer.

It can be learned from the foregoing that, according to this embodiment, information about a roaming service provider selected by a subscriber is acquired, where the information about the roaming service provider includes an identifier of the roaming service provider; then a gateway is selected according to the acquired information about the roaming service provider; and data service processing is performed by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

According to the method described in Embodiment 1, details are further described by using examples in Embodiments 2, 3, 4, and 5.

Embodiment 2

In this embodiment, that a visited network element acquires, from a home subscriber server (that is, HSS) of a home network, information about a roaming service provider selected by a subscriber is used as an example for description.

Figure 2:
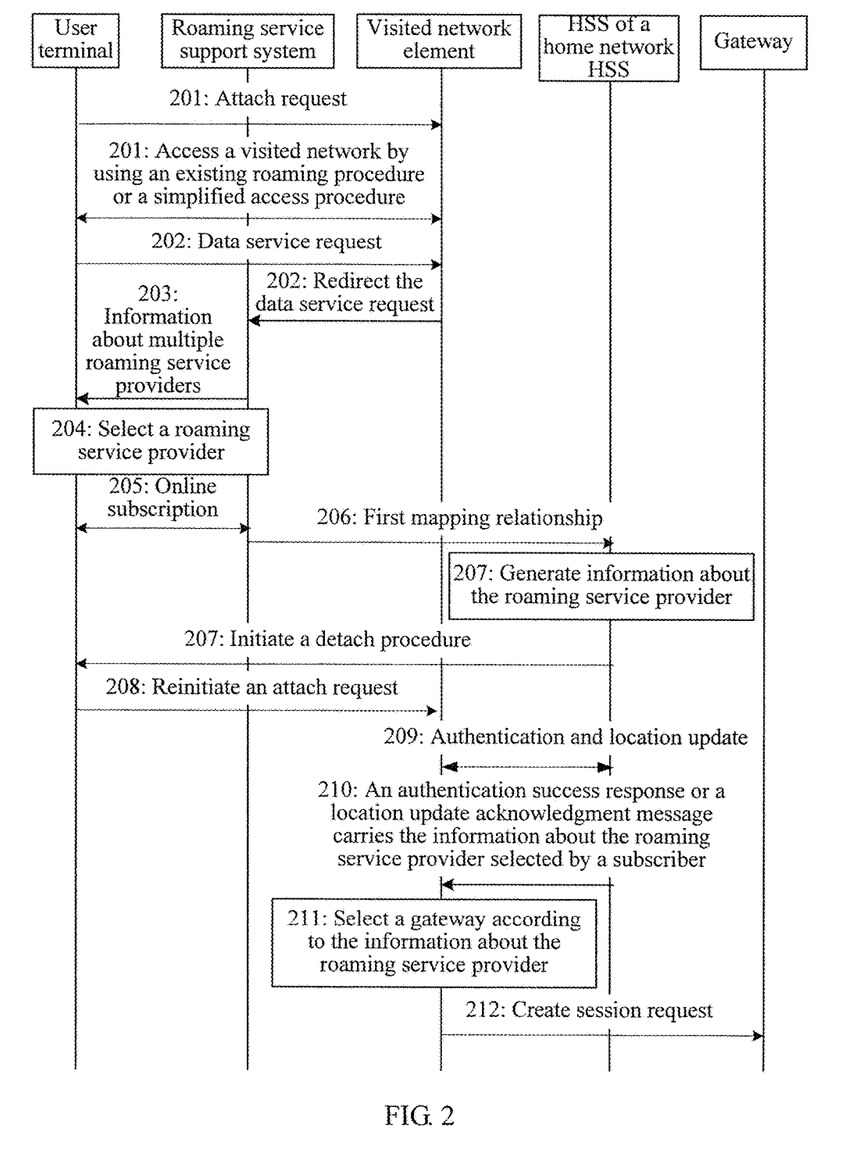
FIG. 2 is a flowchart of a data service processing method in a roaming scenario according to Embodiment 2 of the present invention.

As shown in FIG. 2, a specific process of a data service processing method in a roaming scenario may be as follows:

201. A user terminal initiates an attach request to the visited network element, and accesses a visited network by using an existing roaming procedure or a simplified access procedure.

For example, the visited network element may be specifically a device such as an SGSN or MME of the visited network, that is:

the user terminal may specifically initiate the attach request to the SGSN or MME of the visited network, and access the visited network element by using the existing roaming procedure or the simplified access procedure.

202. The user terminal initiates a data service request to the visited network element, and after receiving the data service request, the visited network element redirects the data service request to a roaming service support system, for example, a portal server.

For example, the user terminal may specifically initiate the data service request to the SGSN or MME of the visited network, and after receiving the data service request, the SGSN or MME of the visited network redirects the data service request to the roaming service support system.

203. The roaming service support system sends information about multiple roaming service providers to the user terminal for selection by the subscriber, where the roaming service providers may be MNOs, or may be MVNOs.

204. The user terminal selects, according to the information about the multiple roaming service providers, a roaming service provider from the received information about the multiple roaming service providers, for example, selects an MVNO.

205. The user terminal performs online subscription with the selected roaming service provider by using the roaming service support system, so as to create account information of the user terminal. The account information may include a user terminal identifier, for example, an IMSI, or may include information such as a charging policy and/or a QoS parameter of a service bearer.

206. The roaming service support system sends a first mapping relationship to the home subscriber server of the home network, where the first mapping relationship is a mapping relationship between a subscriber identifier and an identifier of the roaming service provider selected by the subscriber.

207. After receiving the first mapping relationship, the home subscriber server of the home network generates the information about the roaming service provider according to the first mapping relationship, and may initiate a detach procedure for the user terminal.

The information about the roaming service provider includes at least information that can be used to identify the roaming service provider, that is, includes at least the identifier of the roaming service provider, which, for example, may be specifically an MVNO identifier or a virtual APN.

208. The user terminal reinitiates an attach request to the visited network element.

For example, the user terminal may specifically reinitiate the attach request to the SGSN or MME of the visited network.

209. After receiving the attach request reinitiated by the user terminal, the visited network element requests authentication from the home subscriber server of the home network according to the reinitiated attach request; and the visited network element sends a location update request to the home subscriber server of the home network according to the reinitiated attach request.

210. When the home subscriber server of the home network determines that the authentication succeeds, the home subscriber server of the home network returns an authentication success response to the visited network element, for example, the SGSN or MME of the visited network; and after receiving the location update request, the home subscriber server of the home network returns a location update acknowledgment message to the visited network element, for example, the SGSN or MME of the visited network.

The location update acknowledgment message or the authentication success response may carry the information about the roaming service provider selected by the subscriber.

The information about the roaming service provider includes at least the information that can be used to identify the roaming service provider, which, for example, may be specifically the MVNO identifier or the virtual APN.

211. The visited network element selects a gateway according to the acquired information about the roaming service provider (for example, the MVNO identifier or the virtual APN), for example, selects a P-GW or an S-GW.

212. The visited network element sends a create session request to the selected gateway, so as to create a session, and subsequently perform data service processing, for example, perform subsequent data service access or charging settlement.

It can be learned from the foregoing that, according to this embodiment, a visited network element acquires, from a home subscriber server of a home network, information about a roaming service provider selected by a subscriber, where the information about the roaming service provider includes an identifier of the roaming service provider; and then the visited network element selects a gateway according to the acquired information about the roaming service provider, and performs data service processing by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

Embodiment 3

A difference from Embodiment 2 lies in that, in this embodiment, that a visited network element acquires, from a roaming agent, information about a roaming service provider selected by a subscriber is used as an example for description.

Figure 3:
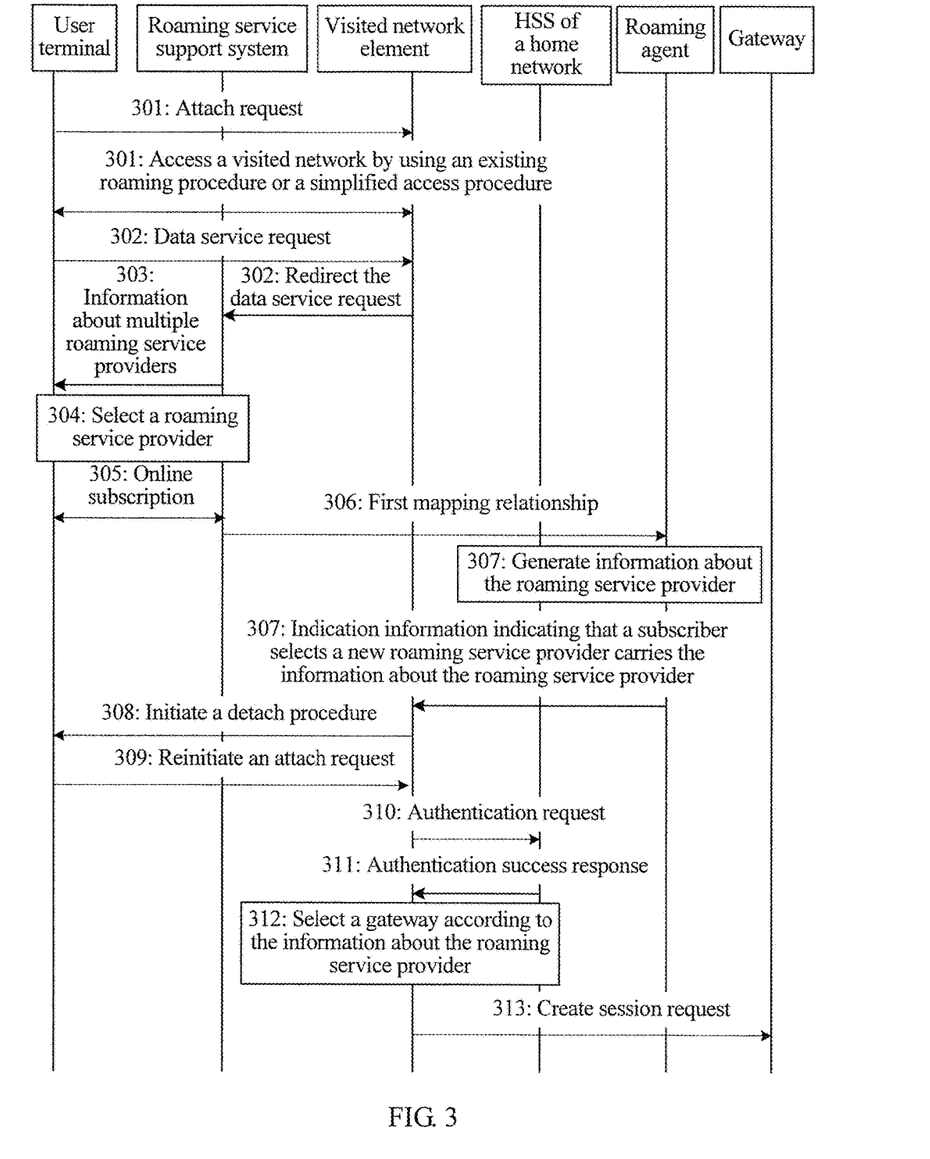
FIG. 3 is a flowchart of a data service processing method in a roaming scenario according to Embodiment 3 of the present invention.

A data service processing method in a roaming scenario is shown in FIG. 3, and a specific process may be as follows:

301. A user terminal initiates an attach request to the visited network element, and accesses a visited network by using an existing roaming procedure or a simplified access procedure.

For example, the visited network element may be specifically a device such as an SGSN or MME of the visited network, that is:

the user terminal may specifically initiate the attach request to the SGSN or NNE of the visited network, and access the visited network element by using the existing roaming procedure or the simplified access procedure.

302. The user terminal initiates a data service request to the visited network element, and after receiving the data service request, the visited network element redirects the data service request to a roaming service support system, for example, a portal server.

For example, the user terminal may specifically initiate the data service request to the SGSN or MME of the visited network, and after receiving the data service request, the SGSN or MME of the visited network redirects the data service request to the roaming service support system.

303. The roaming service support system sends information about multiple roaming service providers to the user terminal for selection by the subscriber, where the roaming service provider may be MNOs, or may be MVNOs.

304. The user terminal selects, according to the information about the multiple roaming service providers, a roaming service provider from the received information about the multiple roaming service providers, for example, selects an MVNO.

305. The user terminal performs online subscription with the selected roaming service provider by using the roaming service support system, so as to create account information of the user terminal. The account information may include a user terminal identifier, for example, an IMSI, or may include information such as a charging policy and/or a QoS parameter of a service bearer.

306. The roaming service support system sends a first mapping relationship to the roaming agent, where the first mapping relationship is a mapping relationship between a subscriber identifier and an identifier of the roaming service provider selected by the subscriber.

307. After receiving the first mapping relationship, the roaming agent generates the information about the roaming service provider according to the first mapping relationship and sends, to the visited network element, indication information indicating that the subscriber selects a new roaming service provider.

The indication information carries the information about the roaming service provider selected by the subscriber, where the information about the roaming service provider includes at least information that can be used to identify the roaming service provider, that is, includes at least the identifier of the roaming service provider, which, for example, may be specifically an MVNO identifier or a virtual APN.

308. After receiving the indication information, the visited network element initiates a detach procedure for the user terminal.

309. The user terminal reinitiates an attach request to the visited network element.

For example, the user terminal may specifically reinitiate the attach request to the SGSN or MME of the visited network.

310. After receiving the attach request reinitiated by the user terminal, the visited network element requests authentication and location update from a home subscriber server of a home network according to the reinitiated attach request.

It should be noted that, for ease of description, a signaling flow related to the location update is omitted in FIG. 3.

311. When the home subscriber server of the home network determines that the authentication succeeds, the home subscriber server of the home network returns an authentication success response to the visited network element, for example, the SGSN or MME of the visited network; and the home subscriber server of the home network returns a location update acknowledgment message to the visited network element, for example, the SGSN or MME of the visited network.

312. The visited network element selects a gateway according to the information (for example, the MVNO identifier or the virtual APN) about the roaming service provider that is received in step 307, for example, selects a P-GW or an S-GW.

313. The visited network element sends a create session request to the selected gateway, so as to create a session, and subsequently perform data service processing, for example, perform subsequent data service access or charging settlement.

It can be learned from the foregoing that, according to this embodiment, a visited network element acquires, from a roaming agent, information about a roaming service provider selected by a subscriber, where the information about the roaming service provider includes an identifier of the roaming service provider; and then the visited network element selects a gateway according to the acquired information about the roaming service provider, and performs data service processing by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

Embodiment 4

A difference from Embodiments 2 and 3 lies in that, in this embodiment, that a visited network element acquires, from a home subscriber server (that is, HSS) of a visited network, information about a roaming service provider selected by a subscriber is used as an example for description.

Figure 4:
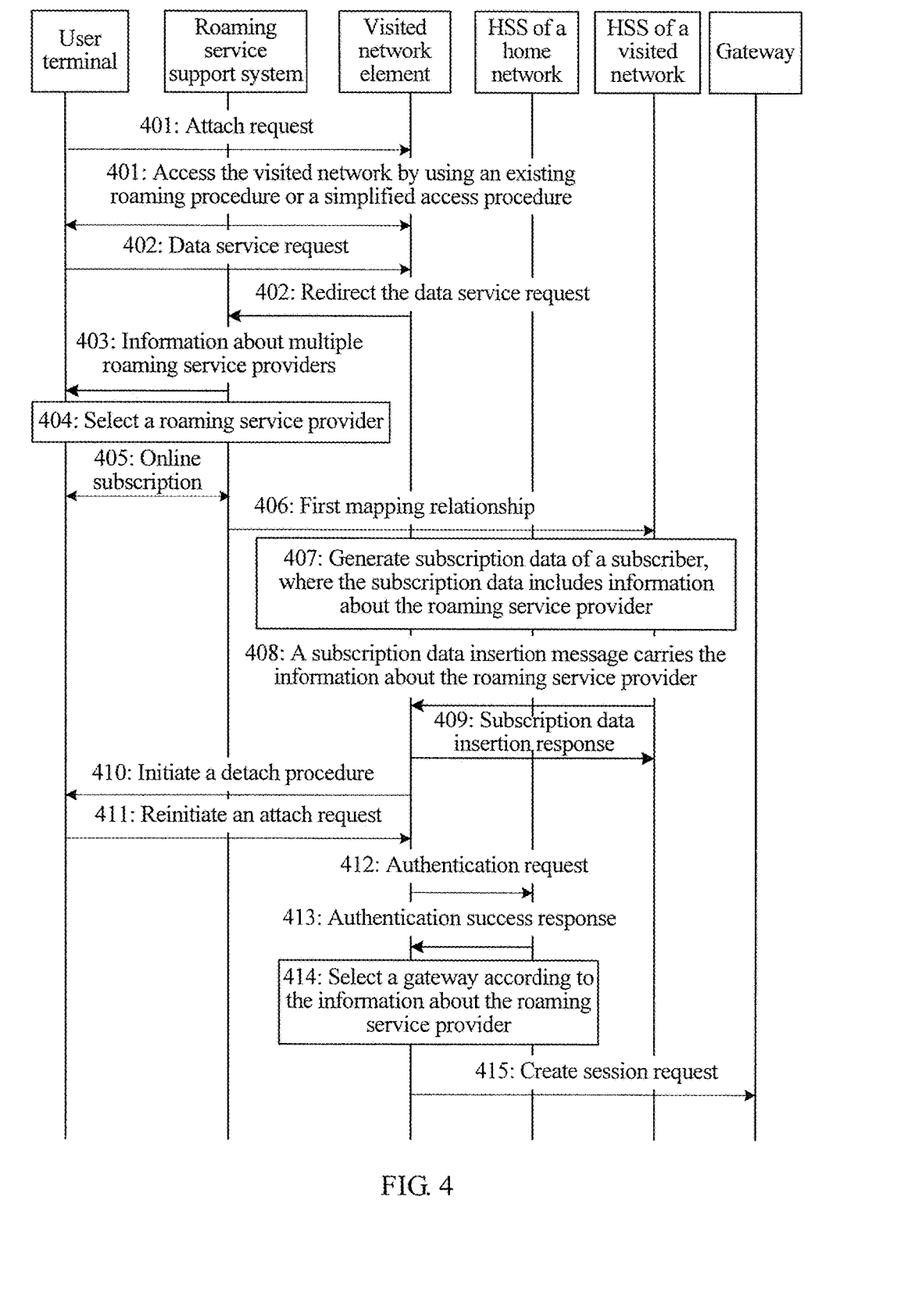
FIG. 4 is a flowchart of a data service processing method in a roaming scenario according to Embodiment 4 of the present invention.

As shown in FIG. 4, a specific process of a data service processing method in a roaming scenario may be as follows:

401. A user terminal initiates an attach request to the visited network element, and accesses the visited network by using an existing roaming procedure or a simplified access procedure.

For example, the visited network element may be specifically a device such as an SGSN or MME of the visited network, that is:

the user terminal may specifically initiate the attach request to the SGSN or MME of the visited network, and access the visited network element by using the existing roaming procedure or the simplified access procedure.

402. The user terminal initiates a data service request to the visited network element, and after receiving the data service request, the visited network element redirects the data service request to a roaming service support system, for example, a portal server.

For example, the user terminal may specifically initiate the data service request to the SGSN or MME of the visited network, and after receiving the data service request, the SGSN or MME of the visited network redirects the data service request to the roaming service support system.

403. The roaming service support system sends information about multiple roaming service providers to the user terminal for selection by the subscriber, where the roaming service providers may be MNOs, or may be MVNOs.

404. The user terminal selects, according to the information about the multiple roaming service providers, a roaming service provider from the received information about the multiple roaming service providers, for example, selects an MVNO.

405. The user terminal performs online subscription with the selected roaming service provider by using the roaming service support system, so as to create account information of the user terminal. The account information may include a user terminal identifier, for example, an IMSI, or may include information such as a charging policy and/or a QoS parameter of a service bearer.

406. The roaming service support system sends a first mapping relationship to the home subscriber server of the visited network, where the first mapping relationship is a mapping relationship between a subscriber identifier and an identifier of the roaming service provider selected by the subscriber.

407. After receiving the first mapping relationship, the home subscriber server of the visited network generates subscription data of the subscriber according to the first mapping relationship, where the subscription data includes the information about the roaming service provider.

The information about the roaming service provider includes at least information that can be used to identify the roaming service provider, that is, includes at least the identifier of the roaming service provider, which, for example, may be specifically an MVNO identifier or a virtual APN.

408. The home subscriber server of the visited network sends a subscription data insertion message to the visited network element.

The subscription data insertion message carries the information about the roaming service provider selected by the subscriber.

409. The visited network element returns an insert subscription data response message to the home subscriber server of the visited network.

410. The visited network element initiates a detach procedure for the user terminal.

411. The user terminal reinitiates an attach request to the visited network element.

For example, the user terminal may specifically reinitiate the attach request to the SGSN or MME of the visited network.

412. After receiving the attach request reinitiated by the user terminal, the visited network element requests authentication and location update from a home subscriber server of a home network according to the reinitiated attach request.

It should be noted that, for ease of description, a signaling flow related to the location update is omitted in FIG. 4.

413. When the home subscriber server of the home network determines that the authentication succeeds, the home subscriber server of the home network returns an authentication success response to the visited network element, for example, the SGSN or MME of the visited network; and the home subscriber server of the home network returns a location update acknowledgment message to the visited network element, for example, the SGSN or NNE of the visited network.

414. The visited network element selects a gateway according to the information (for example, the MVNO identifier or the virtual APN) about the roaming service provider that is received in step 408, for example, selects a P-GW or an S-GW.

415. The visited network element sends a create session request to the selected gateway, so as to create a session, and subsequently perform data service processing, for example, perform subsequent data service access or charging settlement.

It can be learned from the foregoing that, according to this embodiment, a visited network element acquires, from a home subscriber server of a visited network, information about a roaming service provider selected by a subscriber, where the information about the roaming service provider includes an identifier of the roaming service provider; and then the visited network element selects a gateway according to the acquired information about the roaming service provider, and performs data service processing by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

Embodiment 5

A difference from Embodiments 2, 3, and 4 lies in that, in this embodiment, that a visited network element acquires, from a user terminal, information about a roaming service provider selected by a subscriber is used as an example for description.

Figure 5:
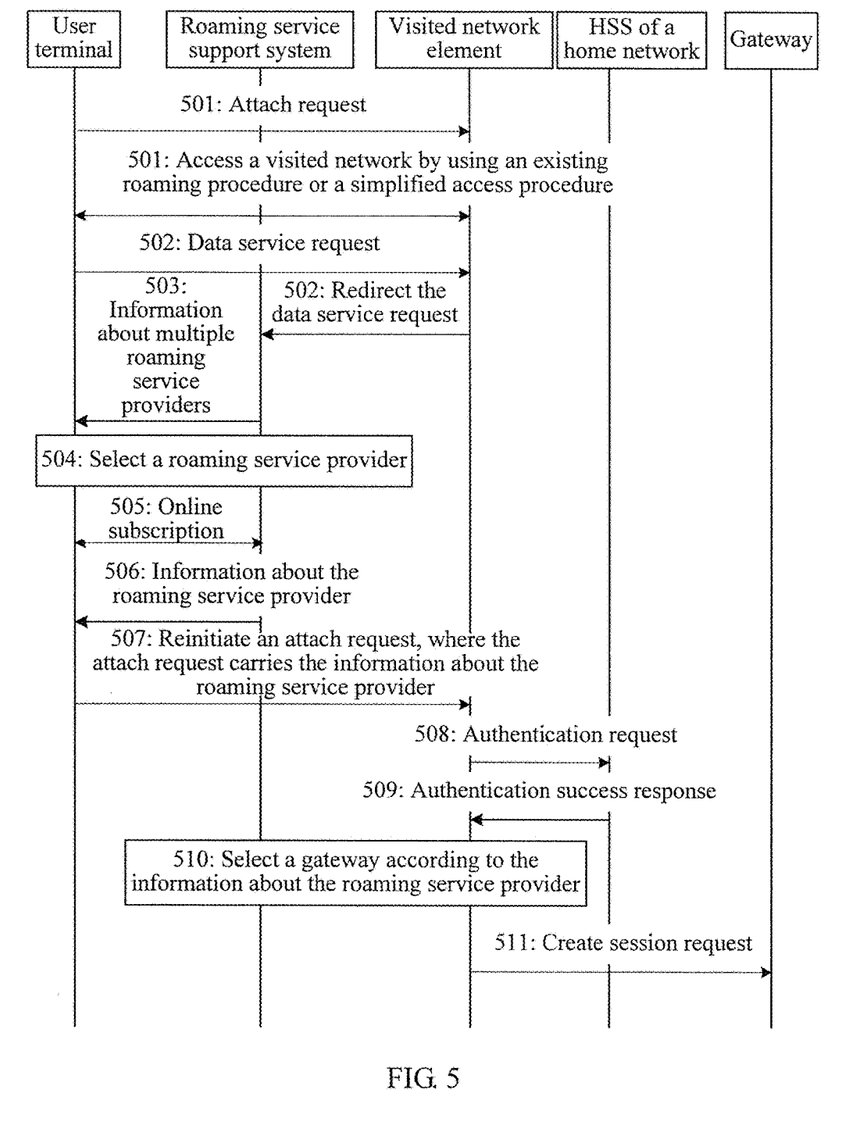
FIG. 5 is a flowchart of a data service processing method in a roaming scenario according to Embodiment 5 of the present invention.

As shown in FIG. 5, a specific process of a data service processing method in a roaming scenario may be as follows:

501. A user terminal initiates an attach request to the visited network element, and accesses a visited network by using an existing roaming procedure or a simplified access procedure.

For example, the visited network element may be specifically a device such as an SGSN or MME of the visited network, that is:

the user terminal may specifically initiate the attach request to the SGSN or MME of the visited network, and access the visited network element by using the existing roaming procedure or the simplified access procedure.

502. The user terminal initiates a data service request to the visited network element, and after receiving the data service request, the visited network element redirects the data service request to a roaming service support system, for example, a portal server.

For example, the user terminal may specifically initiate the data service request to the SGSN or MME of the visited network, and after receiving the data service request, the SGSN or MME of the visited network redirects the data service request to the roaming service support system.

503. The roaming service support system sends information about multiple roaming service providers to the user terminal for selection by the subscriber, where the roaming service providers may be MNOs, or may be MVNOs.

504. The user terminal selects, according to the information about the multiple roaming service providers, a roaming service provider from the received information about the multiple roaming service providers, for example, selects an MVNO.

505. The user terminal performs online subscription with the selected roaming service provider by using the roaming service support system, so as to create account information of the user terminal. The account information may include a user terminal identifier, for example, an IMSI, or may include information such as a charging policy and/or a QoS parameter of a service bearer.

506. The roaming service support system generates the information about the roaming service provider according to a first mapping relationship, and sends the information about the roaming service provider to the user terminal.

For example, specifically, the information about the roaming service provider may be sent to the user terminal in a manner such as OMA DM or OTA.

507. The user terminal reinitiates an attach request to the visited network element.

For example, the user terminal may specifically reinitiate the attach request to the SGSN or MME of the visited network.

The reinitiated attach request carries the information about the roaming service provider selected by the subscriber.

The information about the roaming service provider includes at least information that can be used to identify the roaming service provider, which, for example, may be specifically an MVNO identifier or a virtual APN.

508. After receiving the attach request reinitiated by the user terminal, the visited network element requests authentication and location update from a home subscriber server of a home network according to the reinitiated attach request.

It should be noted that, for ease of description, a signaling flow related to the location update is omitted in FIG. 5.

509. When the home subscriber server of the home network determines that the authentication succeeds, the home subscriber server of the home network returns an authentication success response to the visited network element, for example, the SGSN or MME of the visited network; and the home subscriber server of the home network returns a location update acknowledgment message to the visited network element, for example, the SGSN or MME of the visited network.

510. The visited network element selects a gateway according to the acquired information (for example, the MVNO identifier or the virtual APN) about the roaming service provider, for example, selects a P-GW or an S-GW.

511. The visited network element sends a create session request to the selected gateway, so as to create a session, and subsequently perform data service processing, for example, perform subsequent data service access or charging settlement.

It can be learned from the foregoing that, according to this embodiment, a visited network element acquires, from a user terminal, information about a roaming service provider selected by a subscriber, where the information about the roaming service provider includes an identifier of the roaming service provider; and then the visited network element selects a gateway according to the acquired information about the roaming service provider, and performs data service processing by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

Embodiment 6

Figure 6A:
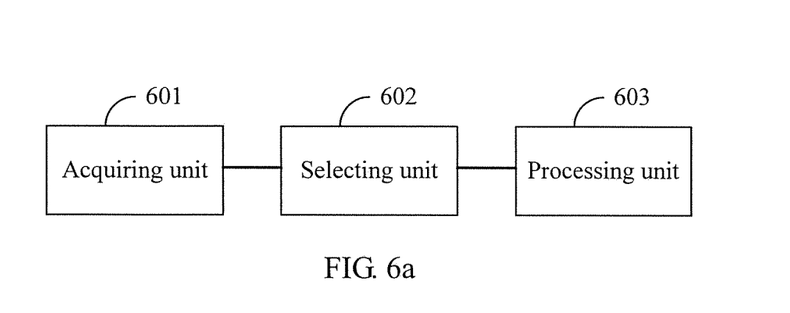
FIG. 6a is a schematic structural diagram of a network side device according to an embodiment of the present invention.

Accordingly, this embodiment of the present invention further provides a network side device, which may serve as a visited network element. As shown in FIG. 6*a*, the network side device includes an acquiring unit 601, a selecting unit 602, and a processing unit 603.

The acquiring unit 601 is configured to acquire information about a roaming service provider selected by a subscriber, where the information about the roaming service provider includes an identifier of the roaming service provider.

For example, the identifier of the roaming service provider may be specifically information such as an MVNO identifier or a virtual APN.

The selecting unit 602 is configured to select a gateway according to the acquired information about the roaming service provider.

The processing unit 603 is configured to perform data service processing by using the gateway.

Multiple manners may be used to acquire the information about the roaming service provider selected by the subscriber, which, for example, may be specifically as follows:

(1) Acquire the information about the roaming service provider from a home subscriber server of a home network, that is:

the acquiring unit 601 may be specifically configured to acquire, from the home subscriber server of the home network, the information about the roaming service provider selected by the subscriber.

For example, the acquiring unit 601 may be specifically configured to: after the home subscriber server of the home network initiates a detach procedure to a user terminal, receive an attach request reinitiated by the user terminal; request authentication and location update from the home subscriber server of the home network according to the attach request reinitiated by the user terminal; and receive an authentication success response and a location update acknowledgment message that are returned by the home subscriber server of the home network, where the authentication success response or the location update acknowledgment message carries the information about the roaming service provider selected by the subscriber.

The information about the roaming service provider selected by the subscriber is generated by the home subscriber server of the home network according to a first mapping relationship provided by a roaming service support system, where the first mapping relationship is a mapping relationship between a subscriber identifier and the identifier of the roaming service provider selected by the subscriber.

(2) Acquire the information about the roaming service provider from a roaming agent device, that is:

the acquiring unit 601 may be specifically configured to acquire, from the roaming agent device, the information about the roaming service provider selected by the subscriber.

For example, the acquiring unit 601 may be specifically configured to receive indication information that is sent by a roaming agent and indicates that the subscriber selects a new roaming service provider, where the indication information carries the information about the roaming service provider selected by the subscriber.

The information about the roaming service provider selected by the subscriber is generated by the roaming agent according to a first mapping relationship provided by a roaming service support system, where the first mapping relationship is a mapping relationship between a subscriber identifier and the identifier of the roaming service provider selected by the subscriber.

In addition, after the indication information that is sent by the roaming agent and indicates that the subscriber selects a new roaming service provider is received, the network side device may further initiate a detach procedure to a user terminal according to the indication information, receive an attach request reinitiated by the user terminal, and then request authentication from a home subscriber server of a home network according to the attach request, that is:

the processing unit 603 may be further configured to initiate the detach procedure to the user terminal according to the indication information; receive the attach request reinitiated by the user terminal; request the authentication from the home subscriber server of the home network according to the attach request; and receive an authentication success response returned by the home subscriber server of the home network.

(3) Acquire the information about the roaming service provider from a home subscriber server of a visited network, that is:

the acquiring unit 601 may be specifically configured to acquire, from the home subscriber server of the visited network, the information about the roaming service provider selected by the subscriber.

For example, the acquiring unit 601 may be specifically configured to receive a subscription data insertion message sent by the home subscriber server of the visited network, where the subscription data insertion message carries the information about the roaming service provider selected by the subscriber.

The information about the roaming service provider selected by the subscriber is generated by the home subscriber server of the visited network according to a first mapping relationship provided by a roaming service support system, where the first mapping relationship is a mapping relationship between a subscriber identifier and the identifier of the roaming service provider selected by the subscriber.

In addition, after the subscription data insertion message sent by the home subscriber server of the visited network is received, the network side device may further initiate a detach procedure for a user terminal, receive an attach request reinitiated by the user terminal, and then request authentication from a home subscriber server of a home network according to the attach request, that is:

the processing unit 603 may be further configured to initiate the detach procedure to the user terminal according to the subscription data insertion message; receive the attach request reinitiated by the user terminal; request the authentication from the home subscriber server of the home network according to the attach request; and receive an authentication success response returned by the home subscriber server of the home network.

(4) Acquire the information about the roaming service provider from a user terminal, that is:

the acquiring unit 601 may be specifically configured to acquire, from the user terminal, the information about the roaming service provider selected by the subscriber.

For example, the acquiring unit 601 may be specifically configured to receive an attach request reinitiated by the user terminal, where the attach request carries the information about the roaming service provider selected by the subscriber.

The information about the roaming service provider selected by the subscriber is provided by a roaming service support system for the user terminal, and the information about the roaming service provider may be sent to the user terminal in a manner such as OMA DM or OTA.

Figure 6B:
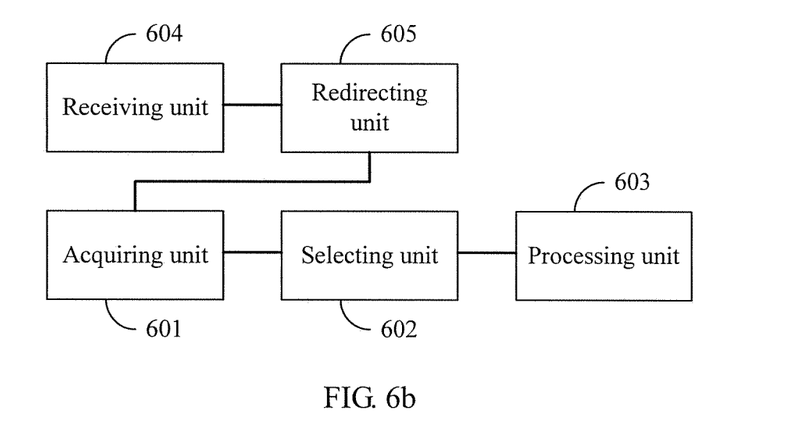
FIG. 6b is another schematic structural diagram of a network side device according to an embodiment of the present invention.

In addition, optionally, before the information about the roaming service provider selected by the subscriber is acquired, the network side device may further receive a data service request initiated by the user terminal, and redirect the data service request to the roaming service support system, so that the roaming service support system sends information about multiple roaming service providers to the user terminal for selection by the subscriber, that is, as shown in FIG. 6b, the network side device may further include a receiving unit 604 and a redirecting unit 605.

The receiving unit 604 is configured to receive the data service request initiated by the user terminal.

The redirecting unit 605 is configured to redirect the data service request to the roaming service support system, so that the roaming service support system sends the information about the multiple roaming service providers to the user terminal for selection by the subscriber.

After selecting the roaming service provider, for example, after selecting an MVNO, the user terminal can perform online subscription with the roaming service provider, so as to create account information of the user terminal. The account information may include a user terminal identifier, for example, an IMSI, or may include information such as a charging policy and/or a QoS parameter of a service bearer.

During specific implementation, each of the foregoing units may serve as an independent entity for implementation or may be randomly combined to serve as a same or several entities for implementation. For specific implementation, reference may be made to the foregoing method embodiments, and details are not described herein.

The network side device may be specifically a device such as an SGSN or MME.

It can be learned from the foregoing that, according to this embodiment, an acquiring unit 601 of a network side device may acquire information about a roaming service provider selected by a subscriber, where the information about the roaming service provider includes an identifier of the roaming service provider; then a selecting unit 602 selects a gateway according to the acquired information about the roaming service provider; and a processing unit 603 performs data service processing by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

Embodiment 7

Accordingly, this embodiment of the present invention further provides a communications system, which includes any network side device provided in embodiments of the present invention. For the network side device, reference may be specifically made to Embodiment 6, which, for example, may be specifically as follows:

The network side device is configured to acquire information about a roaming service provider selected by a subscriber, where the information about the roaming service provider includes an identifier of the roaming service provider, which, for example, may be specifically information such as an MVNO identifier or a virtual APN; select a gateway according to the acquired information about the roaming service provider; and perform data service processing by using the gateway.

For example, the network side device may be specifically configured to acquire, from a home subscriber server of a home network, the information about the roaming service provider selected by the subscriber, which, for example, may be specifically as follows:

after the home subscriber server of the home network initiates a detach procedure to a user terminal, receiving an attach request reinitiated by the user terminal; requesting authentication and location update from the home subscriber server of the home network according to the reinitiated attach request; and receiving an authentication success response and a location update acknowledgment message that are returned by the home subscriber server of the home network, where the authentication success response or the location update acknowledgment message carries the information about the roaming service provider selected by the subscriber.

Alternatively, the network side device may be specifically configured to acquire, from a roaming agent device, the information about the roaming service provider selected by the subscriber, which, for example, may be specifically as follows:

receiving indication information that is sent by a roaming agent and indicates that the subscriber selects a new roaming service provider, where the indication information carries the information about the roaming service provider selected by the subscriber.

Alternatively, the network side device may be specifically configured to acquire, from a home subscriber server of a visited network, the information about the roaming service provider selected by the subscriber, which, for example, may be specifically as follows:

receiving a subscription data insertion message sent by the home subscriber server of the visited network, where the subscription data insertion message carries the information about the roaming service provider selected by the subscriber.

Alternatively, the network side device may be specifically configured to acquire, from a user terminal, the information about the roaming service provider selected by the subscriber, which, for example, may be specifically as follows:

receiving an attach request reinitiated by the user terminal, where the attach request carries the information about the roaming service provider selected by the subscriber.

Optionally, the network side device is further configured to receive a data service request initiated by the user terminal, and redirect the data service request to a roaming service support system, so that the roaming service support system sends information about multiple roaming service providers to the user terminal for selection by the subscriber.

After selecting the roaming service provider, for example, after selecting an MVNO, the user terminal can perform online subscription with the roaming service provider, so as to create account information of the user terminal. The account information may include information such as a user terminal identifier, a charging policy and/or a QoS parameter of a service bearer. For example, the user terminal identifier is an IMSI.

In addition, the communications system may further include other devices, for example, a user terminal, a roaming service support system, a home subscriber server of a home network, and a gateway.

For specific implementation of each of the foregoing devices, reference may be made to the foregoing embodiments, and details are not described herein.

Because the communications system includes any network side device provided in the embodiments of the present invention, the communications system can also achieve a same beneficial effect as the network side device provided in the embodiments of the present invention.

Embodiment 8

In addition, this embodiment of the present invention further provides another network side device, where the network side device may include a processor, a memory, and a transceiver unit.

The processor is configured to acquire information about a roaming service provider selected by a subscriber, where the information about the roaming service provider includes an identifier of the roaming service provider; select a gateway according to the acquired information about the roaming service provider; and perform data service processing by using the selected gateway.

For example, the identifier of the roaming service provider may be specifically an MVNO identifier, a virtual APN, or the like, and the gateway may be specifically a P-GW, an S-GW, or the like.

The memory is configured to store data, for example, store the information about the roaming service provider selected by the subscriber, where the information is acquired by the processor.

The transceiver unit is configured to send and receive data.

Specifically, multiple manners may be used to acquire the information about the roaming service provider selected by the subscriber, which, for example, may be specifically as follows:

The processor may be specifically configured to acquire, from a home subscriber server of a home network, the information about the roaming service provider selected by the subscriber; or acquire, from a roaming agent device, the information about the roaming service provider selected by the subscriber; or acquire, from a home subscriber server of a visited network, the information about the roaming service provider selected by the subscriber; or acquire, from a user terminal, the information about the roaming service provider selected by the subscriber. For details, reference may be made to the foregoing embodiments, and details are not described herein.

Optionally, the processor may be further configured to receive a data service request initiated by the user terminal, and redirect the data service request to a roaming service support system, so that the roaming service support system sends information about multiple roaming service providers to the user terminal for selection by the subscriber.

After selecting the roaming service provider, for example, after selecting an MVNO, the user terminal can perform online subscription with the roaming service provider, so as to create account information of the user terminal. The account information may include information such as a user terminal identifier, a charging policy and/or a QoS parameter of a service bearer. For example, the user terminal identifier is an IMSI.

For specific implementation of each of the foregoing devices, reference may be made to the foregoing embodiments, and details are not described herein.

It can be learned from the foregoing that, according to this embodiment, a processor acquires information about a roaming service provider selected by a subscriber, where the information about the roaming service provider includes an identifier of the roaming service provider, then selects a gateway according to the acquired information about the roaming service provider, and performs data service processing by using the gateway. Because information about a roaming service provider selected by a subscriber may be acquired in this solution, and the information about the roaming service provider includes information that can be used to identify the roaming service provider, even if an MVNO serves as the roaming service provider, the roaming service provider can be identified and differentiated, so that a gateway can be selected subsequently and data service processing, for example, data service access or charging settlement, can be performed.

A person of ordinary skill in the art may understand that all or some of the steps of the methods in the foregoing embodiments may be implemented by a program instructing related hardware. The program may be stored in a computer-readable storage medium. The storage medium may include: a read-only memory (ROM, Read-Only Memory), a random access memory (RAM, Random Access Memory), a magnetic disk, or an optical disc.

The data service processing method, apparatus, and system in a roaming scenario provided in the embodiments of the present invention are described in detail in the foregoing. Specific examples are used in this specification to describe the principle and implementation manners of the present invention. The descriptions of the foregoing embodiments are merely intended to help understand the method and core idea of the present invention. In addition, a person skilled in the art may, according to the idea of the present invention, make modifications with respect to the specific implementation manners and the application scope. Therefore, the content of this specification shall not be construed as a limitation on the present invention.

What is claimed is:

1. A data service processing method in a roaming scenario, the method comprising:
   acquiring, by a network side device of a visited network from a home subscriber server of the visited network, after selection by a subscriber of an alternative roaming provider from among multiple alternative roaming providers associated with the visited network, information about the alternative roaming provider selected by the subscriber, wherein the acquired information comprises at least an identifier of the alternative roaming provider, wherein the alternative roaming provider is a roaming service provider in a roaming area, wherein the roaming service provider is a mobile virtual network operator (MVNO), wherein the identifier of the roaming service provider is a virtual access point name (APN), wherein the virtual APN is different from an actually used APN;
   selecting, by the network side device, a gateway according to the acquired information about the alternative roaming provider;
   performing, by the network side device, data service processing by using the gateway; and
   wherein acquiring, by the network side device from the home subscriber server of the visited network, the information about the alternative roaming provider selected by the subscriber comprises:
      receiving, by the network side device, a subscription data insertion message sent by the home subscriber server after the home subscriber server generates the information about the alternative roaming provider selected by the subscriber according to a first mapping relationship provided by a roaming service support system, the first mapping relationship comprising a mapping relationship between a subscriber identifier and the identifier of the alternative roaming provider selected by the subscriber, the subscription data insertion message carrying the information about the alternative roaming provider selected by the subscriber.

2. The method according to claim 1, wherein after receiving the subscription data insertion message sent by the home subscriber server of the visited network, the method further comprises:
   initiating a detach procedure to a user terminal according to the subscription data insertion message;
   receiving an attach request initiated by the user tell final;
   requesting authentication from a home subscriber server of a home network according to the attach request; and
   receiving an authentication success response returned by the home subscriber server of the home network.

3. The method according to claim 1, wherein before acquiring information about the alternative roaming provider selected by the subscriber, the method further comprises:
   receiving, by the network side device, a data service request initiated by a user terminal; and
   redirecting, by the network side device, the data service request to a roaming service support system, the data service request configured to enable the roaming service support system to send information about the multiple alternative roaming providers to the user terminal for selection by the subscriber.

4. A network side device, comprising:
   a memory configured to store data;
   a transceiver unit configured to send and receive data; and
   a processor configured to:
      acquire, from a home subscriber server of a visited network, after selection by a subscriber of an alternative roaming provider from among multiple alternative roaming providers associated with the visited network, information about the alternative roaming provider selected by the subscriber, wherein the acquired information comprises an identifier of the alternative roaming provider, wherein the alternative roaming provider is a roaming service provider in a roaming area, wherein the roaming service provider is a mobile virtual network operator (MVNO), wherein the identifier of the roaming service provider is a virtual access point name (APN), wherein the virtual APN is different from an actually used APN;
      select a gateway according to the acquired information about the alternative roaming provider,
      perform data service processing by using the gateway, and
      wherein to acquire, from the home subscriber server of the visited network, the information about the alternative roaming provider selected by the subscriber, the processor is configured to:
         receive a subscription data insertion message sent by the home subscriber server after the home subscriber server generates the information about the alternative roaming provider selected by the subscriber according to a first mapping relationship provided by a roaming service support system, the first mapping relationship comprising a mapping relationship between a subscriber identifier and the identifier of the alternative roaming provider selected by the subscriber, the subscription data insertion message carrying the information about the alternative roaming provider selected by the subscriber.

5. The network side device according to claim 4, wherein the processor is further configured to:
   initiate a detach procedure to a user terminal according to the subscription data insertion message;
   receive an attach request initiated by the user terminal;
   request authentication from a home subscriber server of a home network according to the attach request; and
   receive an authentication success response returned by the home subscriber server of the home network.

6. The network side device according to claim 4, wherein the processor is further configured to:
   receive a data service request initiated by a user terminal; and
   redirect the data service request to a roaming service support system, the data service request configured to enable the roaming service support system to send information about the multiple alternative roaming providers to the user terminal for selection by the subscriber.

* * * * *